June 15, 1954 E. McP. LEYTON 2,681,437

APPARATUS FOR INDICATING THE AMPLITUDE OR PHASE VERSUS FREQUENCY CHARACTERISTIC OF AN ELECTRICAL CIRCUIT

Filed March 27, 1951 2 Sheets-Sheet 1

Inventor
ERIC McPHAIL LEYTON
By Ralph E. Atherton
Attorney

June 15, 1954 E. McP. LEYTON 2,681,437
APPARATUS FOR INDICATING THE AMPLITUDE OR PHASE VERSUS FREQUENCY CHARACTERISTIC OF AN ELECTRICAL CIRCUIT
Filed March 27, 1951 2 Sheets-Sheet 2

Inventor
ERIC McPHAIL LEYTON
By Ralph E. Atherton
Attorney

Patented June 15, 1954 2,681,437

UNITED STATES PATENT OFFICE 2,681,437

APPARATUS FOR INDICATING THE AMPLITUDE OR PHASE VERSUS FREQUENCY CHARACTERISTIC OF AN ELECTRICAL CIRCUIT

Eric McPhail Leyton, London, England, assignor to Electric & Musical Industries Limited, Hayes, England, a British company Application March 27, 1951, Serial No. 217,706

Claims priority, application Great Britain April 1, 1950

4 Claims. (Cl. 332—39)

This invention relates to apparatus for indicating the amplitude or phase versus frequency characteristic of a radio frequency circuit included in, for example, an amplitude modulated radio or television transmitter, the object of the invention being to provide improved apparatus for this purpose.

According to the invention, there is provided apparatus for indicating the amplitude or phase-versus-frequency characteristic of a radio frequency circuit comprising means for feeding to said circuit first oscillations, means for generating second oscillations of a cyclically variable frequency, means for modulating said first oscillations by said second oscillations, mixing means, means for generating third oscillations of a variable frequency having the same frequency difference from the lower sideband and the upper sideband respectively of the modulated first oscillations during alternate cycles of variations of said second oscillations, means for feeding said modulated oscillations and said third oscillations to said mixing means to obtain fourth oscillations at said difference frequency, a cathode ray tube and means for deflecting the beam of said tube along one axis in accordance with the frequency of said third oscillations and along another axis in accordance with signals derived from said fourth oscillations. It will hereinafter appear that the present invention leads to the advantage that the upper sideband response and the lower sideband response of the radio frequency circuit are alternately displaced by the cathode ray tube without risk of ambiguity.

In order that the said invention may be clearly understood and readily carried into effect, the same will now be more fully described with reference to the accompanying drawings, Figures 1 to 3 of which are block diagrams illustrating respectively the application of the invention to the investigation of the characteristics of the sidebands of a transmitter, the modulator of a transmitter, and the R. F. section of a transmitter respectively, and Figure 4 is a block diagram which illustrates the invention as applied to the investigation of the phase or phase error of a transmitter.

Figure 1:
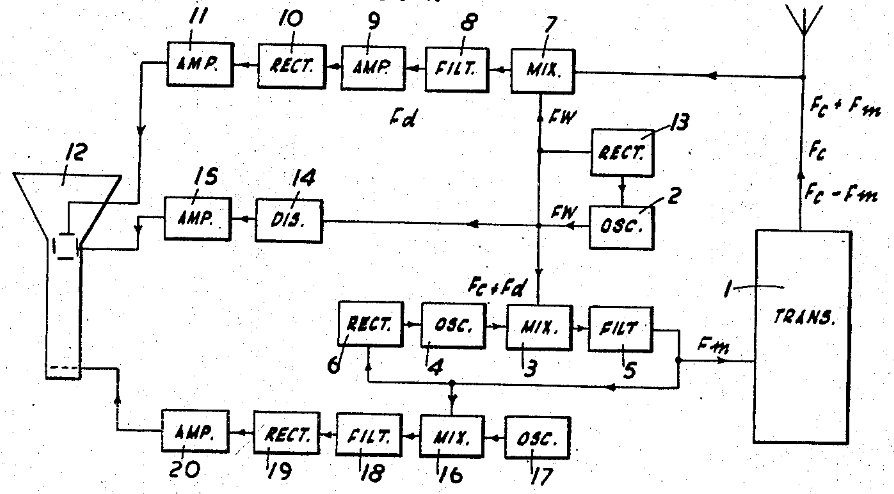

Referring to Figure 1, let $F_c$ be the carrier frequency of a transmitter 1 and $F_m$ the modulation frequency of the transmitter. In order to test the frequency response of the transmitter, $F_m$ must be varied from zero to the maximum modulation frequency $F_m$ required for the test. In practice it is convenient to choose $F_m$ somewhat greater than the normal pass-band of the transmitter so that the ends of the characteristic may be examined. A variable frequency oscillator 2 is arranged to have an output frequency $F_w$ which is varied cyclically, the centre frequency of $F_w$ being $F_c+F_d$, the lower limit being $F_c+F_d-F_m$ and the upper limit being $F_c+F_d+F_m$. The actual value of $F_d$ will be dealt with later but it will in general be a small fraction of $F_m$. The output from oscillator 2 is fed into a mixer 3, to which are also fed oscillations of a fixed frequency $F_c+F_d$ obtained from an oscillator 4, the amplitude of these oscillations being small compared with that of the oscillations of frequency $F_w$ from oscillator 2. The mixer 3 is arranged to give an output at the difference frequency between the two input frequencies. The difference frequency between the two input frequencies will be $F_m$ and since the frequency $F_w$ in the course of its cyclic variation between its frequency limits passes through the fixed frequency $F_c+F_d$ obtained from the oscillator 4, one cycle of variation of $F_w$ has twice the period of the cyclic variation of $F_m$ and it traverses twice the frequency range. This output is fed into a low-pass filter 5 which has a cut-off frequency somewhat greater than $F_m$. The output from filter 5 is fed to the modulation input terminals of the transmitter 1 and is of frequency $F_m$.

In operation, as $F_w$ varies from one extreme to the other $F_m$ will change from $F_m$ down to zero and up again to $F_m$. The amplitude of $F_m$ should be independent of its frequency, except for a small region near zero, and mixer 3 and filter 5 must be designed with this in mind. In order to reduce still further any change of amplitude, a portion of the output from filter 5 is rectified by a rectifier 6 and fed back into oscillator 4 in such a way as to stabilise the amplitude of $F_m$. The oscillations $F_m$ will modulate the output of the transmitter 1 so that the output of the latter will consist of three frequencies namely $F_c$ the carrier, $F_c-F_m$ the lower sideband and $F_c+F_m$ the upper sideband, and it is the amplitude of the two sidebands that it is desired to investigate separately. A small portion of the output from transmitter 1 is therefore fed to a mixer 7, which is also fed with some of the output from oscillator 2 (of frequency $F_w$) to give an output of the difference frequency between its two inputs. The output from mixer 7 is fed to a bandpass filter 8 the centre frequency of which is $F_d$ so that the only frequencies coming from transmitter 1 that will influence the output voltage from filter 8 will be those having a difference of about $F_d$ from $F_w$. If $F_w$ is at its lower limit, that is to say $F_w=F_c+F_d-F_m$, the modulation input frequency to the transmitter $F_m$ will be $F_m$. The output from transmitter 1 will consist instantaneously of three frequencies namely $F_c-F_m$, $F_c$ and $F_c+F_m$. The only one of these frequencies that differs from $F_w$ by $F_d$ is the lower sideband $F_c-F_m$. If mixer 7 is carefully designed the output of frequency $F_d$ from filter 8 will be proportional to the amplitude of the lower sideband of the output of transmitter 1. As $F_w$ is increased in frequency $F_m$ will become lower in frequency until it reaches zero when $F_w=F_c+F_d$, but the difference between $F_w$ and the lower sideband will remain constant at $F_d$. The amplitude of the oscillations of frequency $F_d$ from filter 8 will therefore remain proportional to the amplitude of the lower sideband. As $F_w$ is still further increased from $F_c+F_d$ towards $F_c+F_d+F_m$ the frequency of $F_m$ will increase again from zero to $F_m$. The difference frequency between $F_w$ and the upper sideband of the transmitter output will now be constant and equal to $F_d$, so that the amplitude of the output from filter 8 will now be proportional to the upper sideband. It will thus be appreciated that the elements 3, 4 and 5 constitute means for generating oscillations $F_m$ of a cyclically varying frequency and these oscillations are applied to the transmitter 1 to modulate the carrier wave $F_c$. The element 2 constitutes means for generating other oscillations $F_w$ which, by virtue of the fact that their frequency is cyclically variable with half the periodicity of the frequency variation of the oscillations $F_m$ and covers twice the frequency range, have a frequency difference $F_d$ from the lower sideband of the lower modulated carrier wave during alternate cycles of the oscillations $F_m$ and have the same frequency difference $F_d$ from the upper sideband during the intervening cycles of the oscillations $F_m$. The filter 8, moreover, transmits substantially only frequency difference $F_d$ from the mixer 7.

The output from filter 8 is amplified by the amplifier 9, the output from which is rectified by rectifier 10 and then again amplified by the D. C. amplifier 11 and finally applied to the vertical deflection plates of a cathode ray tube 12. The vertical deflection of the beam of said tube will therefore be proportional to the amplitude of the sidebands, except for three frequency bands where the output from filter 8 will not be proportional to only one of the sidebands. These bands will occur when either the carrier or the unwanted sideband is different from the wanted sideband by an amount equal to about 2 $F_d$, so that they will also produce difference frequencies in mixer 7 of about $F_d$ and will affect the output from filter 8. If, however, the value of $F_d$ and the bandwidth of filter 8 are carefully chosen then these bands may be made narrow and close to the carrier frequency so that they spoil the measurements only at relatively unimportant frequencies.

In order to make the vertical deflection of the beam of the cathode ray tube 12 vary linearly with the amplitude of the sideband it is necessary for the output $F_d$ from mixer 7 to vary linearly with the amplitude of the sideband from transmitter 1. This may be accomplished by arranging for the input to mixer 7 from oscillator 2 to be large compared with the input from transmitter 1 and also arranging that the amplitude of the output of oscillator 2 remains as nearly as possible constant over the frequency range. In order to ensure that this is so, some of the output from oscillator 2 is rectified by a rectifier 13 and the output from rectifier 13 is fed back to oscillator 2 in such a way as to oppose any variations in the amplitude of $F_w$.

In order to obtain the horizontal deflection of the cathode ray tube beam some of the output from oscillator 2 is fed into a frequency discriminator 14 which is constructed to give a substantially linear output with frequency over the band over which $F_w$ varies. The output from discriminator 14 is amplified by a D. C. amplifier 15 and fed to the horizontal deflection plates of the cathode ray tube 12. As $F_w$ varies from one extreme to the other the cathode ray tube will show the amplitude versus frequency characteristics of both of the sidebands.

In order to measure the frequency of any part of the characteristics accurately with respect to $F_m$ some of the output from filter 5 (of frequency $F_m$) is fed into a mixer 16. The other input to mixer 16 is obtained from a calibrated oscillator 17. This oscillator is accurately calibrated over the range of $F_m$, that is from a low frequency up to $F_m$. The mixer 16 is designed to give an output difference frequency between its two inputs, and said output is fed into a low-pass filter 18, the bandwidth of this filter being quite small so that a voltage will appear at its outward circuit only when the output frequency from oscillator 17 is nearly equal to $F_m$. The output from filter 18 is rectified by a rectifier 19, then amplified by an amplifier 20 and applied to the control electrode of the cathode ray tube 12. As $F_m$ varies through its frequency range a pulse will be applied to said control electrode when $F_m$ passes through the frequency to which oscillator 17 is tuned. This pulse can be arranged either to brighten or darken the trace of the cathode ray tube, thus providing a marker point on the characteristics.

It is advantageous to keep the number of complete sweeps per second of the cathode ray beam to as low a value as is consistent with producing a picture on the cathode ray tube screen that does not flicker excessively. There may for example be 100 sweeps per second, oscillator 2 having a frequency of variation $F_s$ of about 50 cycles per second since the cathode ray tube will produce two complete sweeps per cycle.

In order that the amplitude characteristic may be correctly delineated on the cathode ray tube, the frequency response of rectifier 10 and amplifier 11 must be constant up to a frequency considerably higher than $F_s$. A hundred times $F_s$ would be sufficient which means that the said response must be flat up to 5 kc./s., but it is not difficult to provide a wider band than this if required.

The rectifier 10 must have some smoothing means at its output side so that the input frequency to rectifier 10 ($F_d$) must be large compared with 5 kc./s. A factor of ten would be sufficient; thus the minimum frequency for $F_d$ is 50 kc./s. The frequency $F_d$, however, depends on the difference between the carrier frequency $F_c$ of the transmitter 1 and the frequency of oscillator 4 and, since neither of these will be perfectly stable, allowance must be made for their drift so as to ensure that $F_d$ never falls below 50 kc.

If both transmitter 1 and oscillator 4 are crystal controlled they can easily be made to have a frequency which is stable to 50 parts in $10^6$, so that $F_d$ should have a centre value of $$50{,}000+2F_c\times\frac{50}{10^6}$$

to allow for the maximum drift. If the apparatus is designed for a maximum $F_c$ of 200 mc./s.

$$F_d=50{,}000+\frac{2\times 200}{10^6}\times 50\times 10^6=70 \text{ kc./s.}$$

The passband of filter 8 and amplifier 9 must be centred at $F_d$ and be wide enough to allow for both the modulation (5 kc./s.) and the frequency drift (20 kc./s.). It should be noted that it is an advantage to keep $F_d$ as low as possible and the passbands of parts 8 and 9 as small as possible. This is in order to reduce the unwanted effects near the carrier frequency when both sidebands, or the carrier and one sideband, produce frequencies which will pass through filter 8 and amplifier 9.

In a particular example of this apparatus $F_c$ is 62 mc./s., $F_m$ is 8 mc./s., $F_d$ is 0.1 mc./s. and the passband of filter 8 and amplifier 9 is from 50 to 150 kc./s.

Figure 2:
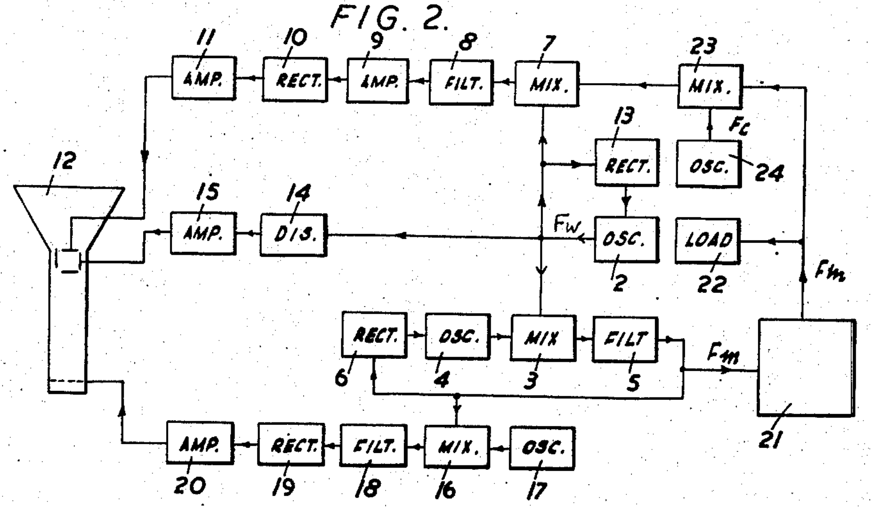

Referring now to Figure 2, which shows the invention applied to the testing of the modulation frequency part only of the transmitter, reference numeral 21 indicates the modulation frequency equipment under test, the input frequency $F_m$ being fed thereto in the same way as in the case of a complete transmitter. The output from equipment 21 is fed into an artificial load 22 and a small part of it is also fed to a mixer 23, which is also fed with a carrier wave of frequency $F_c$ derived from an independent oscillator 24 so that the units 23 and 24 now behave in exactly the same way as would the R. F. stages of the transmitter. The output from mixer 23 is fed into mixer 7 and measurements can be made in exactly the same way as before. Care must of course be taken to ensure that mixer 23 does not itself introduce any error.

In this case the cathode ray tube 12 will still produce two characteristics corresponding to the two sidebands, but these of course will be identical. If desired the carrier wave may be derived from the oscillator of the transmitter instead of an independent oscillator.

Figure 3:
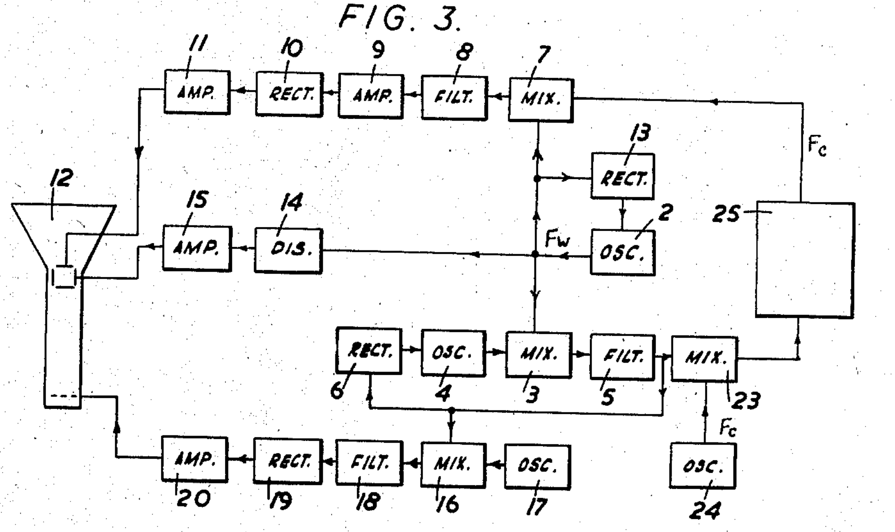
Figure 4:
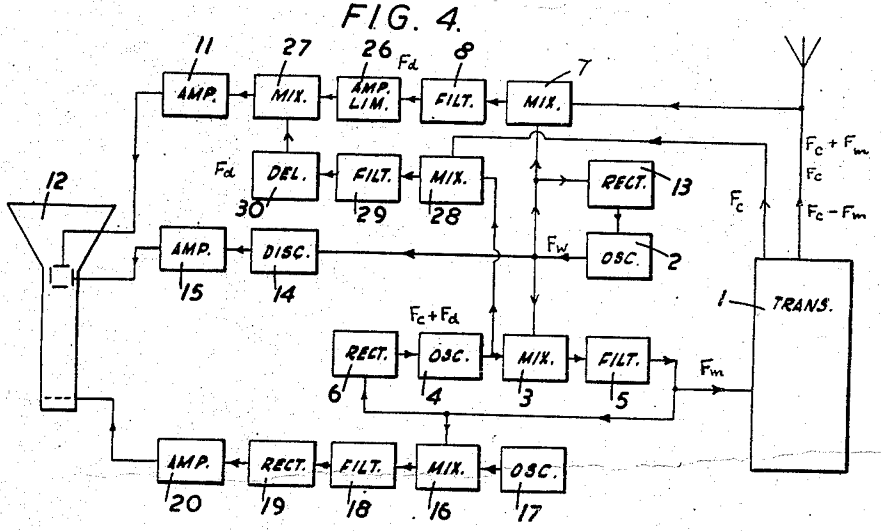

The arrangement of Figure 3 is similar to that shown in Figure 2, the only difference being that the R. F. section 25 of the transmitter, which is the section to be tested in this case, is connected to the output circuit of mixer 23 instead of to the input circuit thereof. The operation is similar to that of the arrangement of Figure 2.

In certain cases television equipment will not function properly without pulses corresponding to synchronising pulses, since these are necessary for the D. C. restoration and black level clamp. A suitable pulse adding device may be connected between filter 5 and the apparatus under test when necessary. If the added pulses are not synchronous with $F_s$ they will not seriously affect the working of the apparatus, and the pulse will not be seen clearly on the cathode ray tube.

So far the invention has been described as employed for measuring the amplitude versus frequency response of a transmitter or allied apparatus. Figure 4 shows an arrangement for indicating the phase or phase error of apparatus under test. By phase error is meant the amount by which the phase between the input and output differs from a linear relation to frequency. In the arrangement shown in Figure 4 the output from filter 8 is fed into an amplifier and limiter 26 which feeds a signal of constant amplitude and frequency $F_d$ into a mixer 27 (which replaces rectifier 10 of Figure 1). In addition oscillations of frequency $F_c$ are taken from the oscillator in transmitter 1 and fed into a mixer 28, which is also fed with some of the output from oscillator 4 of frequency $F_c+F_d$. Mixer 28 gives an output of the difference frequency between its two inputs which is passed through a filter 29 which gives an output of frequency $F_d$, which is fed through a variable time delay network 30 into the mixer 27. Both the inputs to mixer 27 will therefore be of frequency $F_d$ but the input from network 30 will have a phase which is independent of the frequency $F_w$ of the output from oscillator 2, while the phase of the input from amplifier 26 will depend on the phase characteristic of the apparatus under test. The mixer 27 is used as a phase discriminator, that is to say, it gives an output which is proportional to the cosine of the phase difference between its two inputs. The output from mixer 27 is applied to the vertical deflection plates of the cathode ray tube 12 via the amplifier 11, so that the vertical deflection of the trace will also be proportional to the cosine of said phase difference. If the time delay network 30 is adjusted to have zero time delay, the beam will draw a curve representative of the phase response of the apparatus under test. If network 30 is adjusted to have a time delay equal to the low frequency time delay of the apparatus under test, then the beam will trace a curve of the cosine of phase error versus frequency.

The equipment of Figure 4 may be modified for measuring the phase characteristic of the radio frequency or modulation frequency portion of the transmitter separately in the same way as it is modified as shown in Figures 2 and 3 for measuring the amplitude versus frequency characteristics of said portions.

What I claim is:

1. Apparatus for indicating the amplitude or phase-versus-frequency characteristic of a radio frequency circuit, comprising means for feeding to said circuit first oscillations, means for generating second oscillations of a continuously variable frequency, means for amplitude modulating said first oscillations by said second oscillations, mixing means, means for generating third oscillations of a variable frequency having the same frequency difference from the lower sideband and the upper sideband respectively of the modulated first oscillations during alternate cycles of variation of said second oscillations, means for feeding said modulated oscillations and said third oscillations to said mixing means to obtain beat frequency oscillations, filter means for selecting beat frequency oscillations of a predetermined frequency from said mixing means, a cathode ray tube, and means for deflecting the beam of said tube along one axis in accordance with the frequency of said third oscillations and along a second axis in accordance with signals derived from said beat frequency oscillations.

2. Apparatus according to claim 1 including rectifying means for rectifying said beat frequency oscillations, and means for feeding signals derived from said rectifying means to said cathode ray tube to deflect said beam in accordance with the amplitude of said fourth oscillations.

3. Apparatus according to claim 1 including further mixing means, means for feeding said beat frequency oscillations to said further mixing means, means for also feeding to said further mixing means oscillations of the frequency of said heat frequency oscillations but having a fixed phase, means for obtaining from said further mixing means signals having an amplitude dependent on the relative phase of said oscillations fed to said further mixing means, said last named signals being fed to said cathode ray tube to deflect said beam along said second axis.

4. Apparatus according to claim 3 including a variable time delay network, and means for feeding said beat frequency oscillations of fixed phase through said delay network prior to feeding said oscillations to said further mixing means.

References Cited in the file of this patent

UNITED STATES PATENTS

| Number | Name | Date |
|---|---|---|
| 2,280,524 | Hansen ------------ | Apr. 21, 1942 |
| 2,378,612 | Woerner ----------- | June 19, 1945 |
| 2,579,160 | Stribling, Jr. et al. -- | Dec. 18, 1951 |

FOREIGN PATENTS

| Number | Country | Date |
|---|---|---|
| 113,637 | Australia ---------- | Aug. 21, 1941 |